Aug. 6, 1940.  A. A. SCHUBRING  2,210,046
VALVE SEAT
Filed May 27, 1939

INVENTOR
Albert A. Schubring
BY
ATTORNEY

Patented Aug. 6, 1940

2,210,046

UNITED STATES PATENT OFFICE 2,210,046

VALVE SEAT

Albert A. Schubring, Sunnyside, N. Y.

Application May 27, 1939, Serial No. 276,061

6 Claims. (Cl. 251—167)

This invention relates to valve seats, and more particularly to a replaceable valve seat for use in a faucet.

Over a period of many years, many attempts have been made to improve the construction of the shut-off valves used in water or other faucets which are subjected to constant use. This construction is virtually standardized and includes a seat member and a threaded spindle which is screwed into contact with the seat to form the valve. Most of the seats in common use are of metal, and the spindle carries a washer or gasket of some compressible material in order to seal the valve opening more completely. The disadvantage of this construction is that either the seat or washer or both have a strong tendency to wear out and must be replaced relatively often.

Many attempts have therefore been made to solve this problem by supplying a readily replaceable valve seat or washer, but none has been successful. The washers wear out too rapidly. Replaceable seats of metal are impracticable for the reason that it is extremely difficult to make a water-tight fit between the seat and the sides of the valve openings, which are frequently worn irregularly. On the other hand, the use of seats of deformable or expansible material such as wood has proved unsatisfactory for the reason that such materials tend to expand inwardly as well as outwardly and thus block the valve opening.

It is accordingly the primary object of this invention to provide a solution to the problems outlined above.

More specifically it is an object of the invention to provide an improved type of replaceable valve seat which will expand in place in the presence of moisture and thus fit tightly any shape of valve opening while at the same time maintaining a uniform interior diameter.

Another object is to provide such a valve seat which will be inexpensive, efficient and easy to extract and replace when worn out.

A further object is to simplify the construction of valve spindles in faucets.

Figure 1:
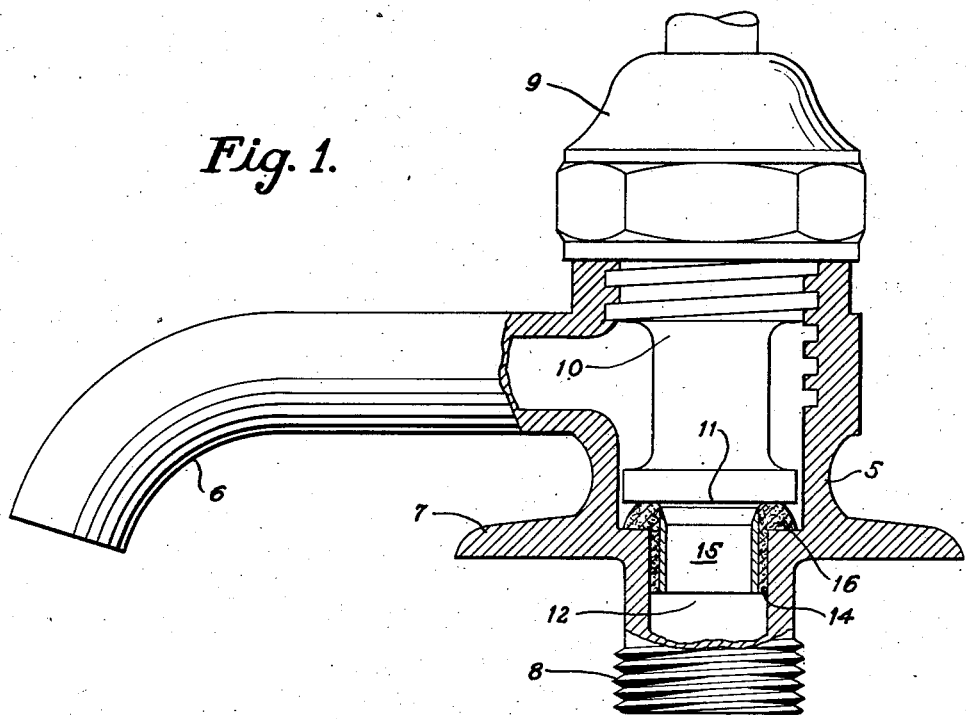
Figures 2, 3:
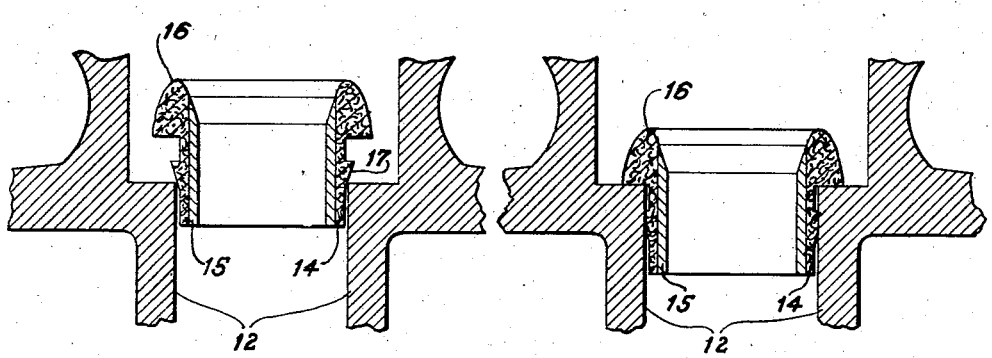

Other objects and advantages will in part appear and in part be pointed out in the course of the following description of one embodiment of the invention, which is given as a non-limiting example in connection with the accompanying drawing, in which Figure 1 is an elevation partly in section showing a conventional type of water faucet embodying the improved valve seat and valve spindle of the invention;

Figure 2 is an enlarged detail view in section showing a valve seat constructed in accordance with the invention partially inserted in a valve opening; and Figure 3 is a view similar to Fig. 2, showing the valve seat in position but before it has been put in contact with the water.

The faucet 5 in Fig. 1 includes the conventional spigot 6, flange 7, threaded inlet 8, cap 9 and threaded spindle 10 which connects to the faucet handle, not shown. It will be noted, however, that spindle 10 terminates at its lower end in a plain, flat valve 11 instead of carrying a washer or countersunk gasket such as is commonly found in such devices. Mounted in valve opening 12 is a valve seat constructed in accordance with this invention. Fig. 1 shows the faucet in closed position, with spindle 10 screwed down until valve 11 is in contact with the valve seat and so closes opening 12. The faucet is operated in the usual manner, spindle 10 being unscrewed to allow water to flow through opening 12, past valve 11 and out through spigot 6.

The valve seat of the invention is shown more clearly in Figs. 2 and 3. It comprises an exterior, annular sheath member 14 and an inner lining 15 of brass or other suitable metal. Sheath 14 is preferably composed of some compressed fibrous material which will expand in the presence of moisture. It is formed at one end into an enlarged and flanged bead 16 extending above lining 15 and outwardly therefrom. This bead 16 is the part which ultimately serves as the valve seat. It will be noted that sheath 14 is not tapered as has hitherto been considered necessary in such devices. Instead it is cylindrical below flange 16 except for an angular circumferential bead 17 about the approximate middle thereof. This bead is important in installing the device, as is described below.

Figs. 2 and 3 show two stages in the installation of the valve seat of the invention. It is first inserted in valve opening 12 until bead 17 bears against the sides of the opening, as shown in Fig. 2, and prevents further inward movement. The seat unit is then forced further down, as by screwing down spindle 10, until it is firmly seated and flange 16 rests on the top of opening 12 as shown in Fig. 3. During this movement the surplus material in bead 17 will either be sheared off by the top of opening 12 or compressed. In either case the result will be that bead 17 will hold the seat within opening 12 even though there may be clearance between the sides of the latter and the rest of the sheath, as is shown in Fig. 3. This holding action by bead 17 is necessary only until water strikes the valve seat. When this happens, the fibrous material of sheath 14 swells and expands until it completely and tightly fills valve opening 12 as is shown in Fig. 1. At the same time flanged bead 16 softens and spreads outward, thus providing a soft seat for valve 11 and so ensuring a water-tight connection when the faucet is closed.

The advantanges of the device of the invention are numerous. It is clearly simple both to manufacture and to install. It provides a uniform inner diameter for the valve opening and a tight fit therein. It eliminates the necessity for special construction of the spindle and also takes the place of the washer or gasket heretofore found necessary, for it provides in itself the fibre-to-metal connection needed to seal against leakage. An added advantage is that it need only be made in standard sizes, and bead 17 and the expansion of the fibre will take care of any irregularities in valve opening sizes and shapes and thus provide a tight fit. In these and many other ways it is superior to anything available heretofore.

From the foregoing detailed description, it will be understood that the invention is not limited, necessarily, to the specific details of the construction as are herein specifically illustrated and described, as it will be apparent that such details are subject to various modifications which will become apparent readily to one skilled in the art, without departing from the spirit of the invention; and it will be understood, therefore, that it is intended and desired to include within the scope of the invention such modification and changes as may be necessary to adapt it to varying conditions and uses.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A replaceable valve seat unit comprising an exterior annular sheath member composed of material adapted to expand in the presence of moisture, one end of said sheath being formed into a flanged bead adapted to serve as a valve seat, and an inner annular member of rigid material forming a lining for said sheath.

2. A replaceable valve seat unit comprising an exterior annular sheath member composed of material adapted to expand in the presence of moisture, one end of said sheath being formed into a flanged bead adapted to serve as a valve seat, means on said sheath for holding the same in position in a valve opening until said expansion takes place, and an inner annular member of rigid material forming a lining for said sheath.

3. A replaceable valve seat unit comprising an inner annular member of metal, and an outer sheath for said metal of material adapted to expand in the presence of moisture, said sheath being provided with a circumferential bead adapted to be compressed upon insertion into a valve opening and thus to hold said unit in position until said expansion takes place.

4. A replaceable valve seat unit comprising an inner annular member of metal, and an outer sheath for said metal of material adapted to expand in the presence of moisture, one end of said sheath being formed into a flanged bead adapted to serve as a valve seat, said sheath being provided with a circumferential bead adapted to be compressed upon insertion into a valve opening and thus to hold said unit in position until said expansion takes place.

5. A replaceable valve seat unit comprising an exterior annular sheath member of compressed fibrous material adapted to expand in the presence of moisture, one end thereof being formed into a flanged bead adapted to serve as a valve seat, and an inner annular member of rigid material forming a lining for said sheath.

6. A replaceable valve seat unit comprising an exterior annular sheath member of compressed fibrous material adapted to expand in the presence of moisture, one end thereof being formed into a flanged bead adapted to serve as a valve seat, means on said sheath for holding the same in position in a valve opening until said expansion takes place, and an inner annular member of brass forming a lining for said sheath.

ALBERT A. SCHUBRING.